United States Patent [19]

Moore et al.

[11] Patent Number: 4,880,498

[45] Date of Patent: Nov. 14, 1989

[54] DRY STRENGTH RESIN OF AMINO/ALDEHYDE ACID COLLOID WITH ACRYLAMIDE POLYMER, PROCESS FOR THE PRODUCTION THEREOF AND PAPER PRODUCED THEREFROM

[75] Inventors: Sewell T. Moore; William Brevard, both of Stamford, Conn.

[73] Assignee: American Cyanamid Company, Stamford, Conn.

[21] Appl. No.: 296,560

[22] Filed: Jan. 13, 1989

Related U.S. Application Data

[62] Division of Ser. No. 892,654, Aug. 4, 1986, Pat. No. 4,845,148.

[51] Int. Cl.$^4$ .............................................. D21H 3/38
[52] U.S. Cl. .................................. 162/164.6; 162/166
[58] Field of Search .............................. 162/164.6, 166

[56] References Cited

U.S. PATENT DOCUMENTS 2,862,901 12/1958 Suen ..................................... 524/598
4,461,858 7/1984 Adelman .............................. 524/512

Primary Examiner—C. Warren Ivy
Attorney, Agent, or Firm—Frank M. Van Riet

[57] ABSTRACT

Dry strength resins are prepared by reacting acrylamide polymers with amino/aldehyde resin acid colloids during the formation of the colloid. The resultant copolymers are useful as dry strength resins in the formation of paper.

10 Claims, No Drawings

DRY STRENGTH RESIN OF AMINO/ALDEHYDE ACID COLLOID WITH ACRYLAMIDE POLYMER, PROCESS FOR THE PRODUCTION THEREOF AND PAPER PRODUCED THEREFROM

This is a division of application, Ser. No. 892,654, filed Aug. 4, 1986, now U.S. Pat. No. 4,845,148.

BACKGROUND OF THE INVENTION

The treatment of paper-making fibers to render paper made therefrom stronger has a long history of development. Many different chemical additives have been utilized for this purpose. Cationic starches are exemplary, but suffer from being inconsistent in performance, incompatible with other additives, etc. Amino-aldehyde resins have been used to impart wet strength to paper both as resins per se and as acid colloids thereof, see U.S. Pat. Nos. 2,345,543; 2,485,079; 2,485,080; 2,559,220; 2,986,489.

In U.S. Pat. No. 3,594,271, there is disclosed the reaction product of a water-soluble starch and a melamine-formaldehyde acid colloid as a dry strength imparting formaldehyde acid colloid as a dry strength imparting additive for paper. This patent teaches the use of a partially or fully polymerized (condensed) melamine-for-maldehyde resin in the formation of the acid colloid and the reaction of the acid colloid with the starch. While relatively effective, it never proved to be a commercial success because it was not as cost effective as existing products.

U.S. Pat. No. 4,461,858 discloses the manufacture and use of a polyvinyl alcohol/melamine-formaldehyde resin acid colloid in the treatment of paper. The reaction product is said to impart increased processing capability and improved wet and dry strength to the paper. The increased processing capabilities are said to constitute easier process control, and better retention of fines. While the polyvinyl alcohol/melamine-formaldehyde resin acid colloid products have achieved moderate commercial success, they still leave something to be desired in that they are very difficult to prepare in that the process is cumbersome and time consuming, they do not possess a very long storage life, they are relatively expensive and they normally must be prepared at the site of the paper mill and at low solids.

SUMMARY OF THE INVENTION

It has now been discovered that the difficulties of prior dry strength agents based on cationic amino-formaldehyde resins can be overcome and the desired properties discussed above imparted to paper if the amino-formaldehyde resin is reacted with the acrylamide polymer in the form of an acid colloid while the acid colloid is being prepared.

The preparation of reaction products of acrylamide polymers and amino-aldehyde resins is taught in U.S. Pat. No. 2,852,901, hereby incorporated herein by reference. This patent teaches the preferred preparation of the product by forming an aqueous solution of the acid colloid of the amino-aldehyde resin beforehand and then reacting it with an aqueous solution of the acrylamide polymer. Other processes taught for the formation of the product involve the preparation of the amino-aldehyde resin in the presence of the acrylamide polymer, i.e. methylolating the acrylamide polymer with formaldehyde and then reacting with cationic amine, etc. The patent fails to teach the addition of the acrylamide polymer to the amino-aldehyde resin acid colloid during the formation of the acid colloid.

DESCRIPTION OF THE INVENTION INCLUDING PREFERRED EMBODIMENTS

As mentioned above, this invention resides in the formation of dry strength fibrous materials, the materials per se, a method for the formation of a dry-strength agent for use in the manufacture of fibrous materials and the dry strength agent composition per se. It specifically relates to the imparting of dry strength to felted, fibrous, cellulosic materials such as paper, board, shaped pulp articles and the like.

It is a principal object of the present invention to provide paper, board and other fibrous products by combining cellulosic fibers with a novel composition which imparts dry tensile strength and increased internal bonding strength thereto. The invention consists in part in the application of these compositions to water suspensions of hydrated or unhydrated cellulosic papermaking fiber pulp in the beater, stock chest, head box or at any other suitable point ahead of the paper-forming step or the application of the compositions to the fibers of preformed paper as an aqueous spray or as a tub size, either alone or in admixture with other impregnating agents.

The term "paper", as used herein, is meant to include any cellulosic fiber-containing mat or web which is prepared by drawing down a dilute aqueous cellulose fiber suspension which may contain other fibrous matter such as glass fiber, polyamide fiber, viscose fiber and the like. Examples include fabrics, felts, boards, shaped articles, etc.

We have found that the above and other objects are accomplished by applying to fibrous, cellulosic material such as paper pulp, or the fibers of preformed paper, a copolymer of (1) an acid colloid of an amino/aldehyde resin and (2) an acrylamide polymer. We have found that these compositions are substantive to fibers of cellulosic material such as paper pulp in aqueous suspension; i.e., the composition is selectively adsorbed or absorbed by the cellulosic fibers from a dilute aqueous solution or dispersion thereof containing these fibers. This permits the application to cellulosic fibers of sufficient quantities of the dry strength-imparting composition to produce the desired degree of dry strength and internal bonding while the fibers are in dilute aqueous suspensions of the consistency ordinarily used in paper mills, which is about 0.1–6% or, in special processes, at higher consistencies.

The compositions of the present invention comprise an aqueous solution of a copolymer of (1) a partially condensed, i.e., not fully condensed, water-soluble cationic thermosetting amino-aldehyde resin and (2) a water-soluble or water-dispersible, non-anionic acrylamide polymer, the ratio of (1):(2) ranging from about 4:1 to about 1:4, respectively, the solids of said solution being not more than about 20%, by weight, based on the total weight of the solution, the molecular weight of the amino-aldehyde acid colloid portion of the copolymer being less than the molecular weight which is attained when an amino-aldehyde resin colloid is allowed to form completely, before reacting with the acrylamide polymer. In general, the amount of solids preferred, is that amount which will not cause gelation to a stage of non-flowability.

The partially condensed, water-soluble, cationic, thermosetting, amino-aldehyde resin is in a colloidal state when reacted with the acrylamide polymer. It may have a molecular weight between about 500 and 3,000,000 as disclosed in the above patents, which patents are hereby incorporated herein by reference. The preferred amino-aldehyde resins are the melamino-formaldehyde resins, however, urea-formaldehyde; ammelide-formaldehyde resins, however, urea-formaldehyde; ammelide-formaldehyde; dicyandiamide-formaldehyde; biguanide-formaldehyde; urea-formaldehyde polyalkylene polyamine; polyureido, etc., resins can also be utilized to form the novel compositions of the present invention. These resins contain sufficient aldehyde for reaction with the carboxamide groups of the acrylamide polymer. Both the unalkylated and alkylated varieties of the amino-aldehyde resins can be employed. From 1-6 mols of combined aldehyde, preferably 205, and more preferably about 3, per mol of amino compound are used. The resins may be alkylated with 1-6 mols a lower alkyl alcohol to stabilize the resin at high solids before the acid colloid formation.

The acid colloids of amino-aldehyde resins are well known to those skilled in the art and further discussion thereof can be found in TAPPI Monograph Series No. 29; "Wet Strength Paper and Paperboard"; John Weidner, Editor; Tech. Assoc. of the Pulp and Paper Industry, N.Y.C.; 1965, pages 20-32.

The water-soluble or water-dispersible, non-anionic acrylamide polymers useful herein include those homopolymers prepared from acrylamide, methacrylamide, itaconamide, N-alkyl acrylamides, N-alkyl methacrylamides; copolymers of these acrylamides with not more than 50%, preferably not more than 25%, by weight, based on the total weight of polymer, of such non-ionic comonomers as styrene, vinyl chloride, vinyl acetate, methyl acrylate, acrylonitrile, and the like. As mentioned above, the acrylamide polymer must be non-anionic, i.e. cationic or non-ionic. Small amounts, however, of anionic comonomers (i.e., up to about 2%), such as acrylic acid may be tolerated. Cationic monomers such as dimethylaminoethyl acrylate; diallyldimethyl ammonium chloride; methacrylamidopropyl trimethyl ammonium chloride; and the like may be used in amounts up to about 10%, by weight, same basis, especially when there is a high cationicity demand because of the furnish employed or if the paper making process is conducted at neutral or alkaline pH. The presence of the cationic comonomer which causes this increased cationicty increases the retention of the compositions of the present invention to the paper-making fibers. The molecular weight of the acrylamide polymer should range from about 40,000 to about 500,000, preferably from about 75,000 to about 300,000.

The ratio of the amino-aldehyde resin acid colloid to the acrylamide polymer should range from about 4:1 to about 1:4, preferably from about 2:1 to about 1:2, respectively.

The stability of the compositions of the present invention are governed by the solids content thereof. The compositions may be used immediately, i.e., within 15 minutes as produced for imparting dry strength to, e.g, paper at about 20% solids level, however, they are more practically employed sometime after production, i.e, after packaging and shipping to the consumer. At about 8% solids, by weight, based on the weight of the composition, the composition is stable for 48 hours and at about 5% solids it is stable for about 120 hours. Infinite stability is shown at less than about 3% solids.

The amino aldehyde resin acid colloid, as a reaction product with the acrylamide polymer, has a molecular weight lower than that molecular weight which is attained when the acid colloid is allowed to form completely before reacting with the acrylamide polymer. That is to say, it is essential when producing the novel compositions of the present invention that the acrylamide polymer be reacted with the acid colloid during the formation of the acid colloid. The compositions hereof do not exhibit their unusual properties unless this is done, i.e., addition of solutions of the completed acid colloid and the acrylamide polymer; formation of the acid colloid in the presence of the acrylamide polymer ab initio or formation of the amino-aldehyde resin and the acid colloid thereof in the presence of the acrylamide polymer ab initio do not produce satisfactory compositions. Suitable aldehydes beside formaldehyde include acetaldehyde, propionaldehyde, crotonaldehyde, glutaraldehyde and others known to form resins with, for example, triazines. The result of the addition of the acrylamide polymer to the acid colloid during the formation of the acid colloid, while not wishing to be bound by any theory, is that while the colloid is forming, the formed colloid is free to react with the acrylamide polymer immediately. The result is that shorter, but more, chains of the acid colloid react with the acrylamide polymer. Thus, the molecular weight of the grafted acid colloid portion of the final composition is less than a fully completed acid colloid. It is believed that this uniform, more frequent number of acid colloid segments in the final composition results in the unique properties of the instant compositions.

The acrylamide polymer may be added to the amino-aldehyde resin preferably as an aqueous solution or in the form of a dry powder. As discussed above, however it must be added after the acid colloid has begun to form, i.e, after a charge is created on the amino-aldehyde resin by the acid. The compositions of the present invention may be formed by a batch or continuous process.

The novel process of the present invention comprises reacting one mole of a triazine contained in a partially condensed, water-soluble, thermosetting amino-aldehyde resin, in aqueous solution, with from about 0.35 to about 1.5 mol of an acid, under conditions to initiate acid colloid formation but for a period of time insufficient to form a completed acid colloid of said amino-aldehyde resin, and then reacting a water-soluble or water-dispersible, non-anionic acrylamide polymer with said incompletely formed acid colloid for from about 0.5 to about 150 minutes at a temperature ranging from about 40° C. to about 100° C., the ratio of said acrylamide polymer to said incomplete acid colloid ranging from about 4:1 to about 1:4, respectively, the total solids content being not more than about 20%, by weight, based on the weight of the reaction media.

Under the conditions employed during the acid colloid preparation, acid colloid formation begins as evidenced by a build-up of charge or drop in pH or, or the formation of the familiar blue haze normally observed during such a reaction. Generally, a temperature ranging from about 50° C. to about 100° C. and a reaction time of from about 15 seconds to 45 minutes are employed. We have found that higher temperatures require lesser reaction times, i.e, at about 80° C. to about 100° C. the reaction occurs in about 15 seconds to 5 minutes whereas at about 50° C. to about 80° C., from about 5 minutes to 45 minutes is required. Vigorous agitation is useful but not required.

The acids employed to form the acid colloid of the amino-aldehyde resin are well known in the art and include nitric acid, phosphoric acid, lactic acid, hydrochloric acid, citric acid and the like. Hydrochloric acid is preferred. The amount of acid added per mole of amino compound is dependent upon the specific acid used. However, generally from about 0.35 to about 1.5 mol of acid per mol of amino compound is sufficient. For example, hydrochloric acid is effective at 0.35–0.80 mol per mol of amino compound; phosphoric acid is useful at 0.6–1.5 mols per mol of amino compound and nitric acid functions satisfactorily at 0.6–1.0 mol per mole of amino compound. Sulfuric acid is not useful herein because it forms an insoluble sulfate salt with the amino compound. A pH ranging from about 1.0 to about 5.0, preferably from about 1.5 to about 3.0 is normally employed. Dilution to the solids content described above with water follows.

The products produced by the above-described process constitute the unique compositions of this invention.

The novel compositions of the present invention are effective as dry strength agents over a pH of about 4.0 to about 9.0. They are effective with all types of virgin pulp and also recycled pulp including groundwood grades, print grades, linerboard pulp, corrugating medium; waste paper pulps, high ash pulps, filled publication paper pulps; and fine paper grades. They are effective in the presence of fillers and residual pulping chemicals.

The novel compositions of this invention can be applied to paper products by tub application methods if desired. Thus, for example, preformed and completely or partially dried paper prepared from a chemical pulp such as sulfite pulp, sulfate pulp or a mechanical pulp such as goundwood or any mixture thereof may be immersed in or sprayed with a 1% to 5% aqueous solution or dispersion of the composition and impregnated with about 50–100% thereof, based on the weight of the paper. The paper may then be heated for about 0.1 to 60 minutes at temperatures, whereby the paper is dried and polymer-bonding of the fibrils thereof is developed. The resulting paper has increased dry strength, and therefore this method is well suited for the impregnation of stock such as kraft wrapping paper, bag paper board grades and the like.

However, because of the substantive properties of the compositions for cellulosic fibers, i.e., they are water-soluble or water-dispersible under the conditions normally used in preparing paper furnishes, including those containing calcium carbonate or other alkaline sizing materials, they deposit selectively by adsorption or absorption on the fibers of cellulosic paper stock. Accordingly, the compositions may be dissolved in an aqueous suspension of the paper stock and added thereto as an aqueous solution, and this addition may be made in the beater, stock chest, Jordan engine, fan pump, head box or at any other suitable point ahead of the papermaking wire or screen, followed by forming the treated fibers into a felted product on the wire or cylinder. The novel compositions hereof may be used in conjunction with other common paper additives such as rosin, ASA or ketene dimer sizes, anti-foams, anti-microbial agents and the like. Frequently, synergism is noted in such conjoint use, e.g. the sizing imparted by rosin size may be enhanced in their presence.

The pH of the pulp suspension at the point of addition of the composition is not critical and may be any value between about 4 and 9, thus, the process tolerates the presence of alkaline reacting fillers such as calcium carbonate. Optimum strength is generally developed at a pH of between about 4.2 and 7.5 so that, if desired, the process may be performed wholly on the alkaline side. Although appreciable dry strength is noted when as little as 0.1% of the polymer is adsorbed in this manner, it is ordinarily advisable to apply quantities within the range of about 0.15% to 5% or more of the composition solids based on the dry weight of the paper stock.

After adding and incorporating the composition into the furnish and forming the paper, the felted product is preferably heated for about 0.1 to 60 minutes at 75°–300° F. In the usual manner to evaporate water therefrom. This heating also increases or further develops the bond between the cellulosic fibrils that results in dry strength in the finished product.

The following examples are set forth for purposes of illustration only and are not to be construed as limitations on the present invention except as set forth in the appended claims. All parts and percentages are by weight unless otherwise specified.

The term "standard viscosity," as used herein, means the viscosity of a 0.1% solution of the polymer in 1M NaCl in centipoise measured on a Brookfield Viscometer with UL adapter, speed 60 rpm, 25° C.

EXAMPLE 1

(Comparative)

Example 1 of U.S. Pat. No. 2,862,901 is followed explicitly except that in one instance, A) PAREZ®-707 resin, a methylated trimethylolmelamine manufactured by American Cyanamid Company, is used and in a second instance B) PAREZ®-607 resin, a powder form of trimethylol melamine, is employed.

Handsheets are prepared from a furnish comprising 50% white, blank news repulped until chip-free and then blended with beaten bleached softwood Kraft/bleached hardwood Kraft and mixed with the products produced as described above. The pH is 6.5. The resultant paper is tested for internal bond and bursting strength by standard TAPPI methods. The results are set forth in Table I below.

TABLE I

| Example | Treatment | Bursting Strength (lb/in$^2$) | Internal Bond (ft-lbs $\times 10^{-3}$) |
| --- | --- | --- | --- |
| 1A | 6 lbs/ton | 43.6 | 148 |
|  | 9 lbs/ton | 45.7 | 156 |
| 1B | 6 lbs/ton | 43.0 | 136 |
|  | 9 lbs/ton | 46.0 | 163 |
| Blank #1 | — | 42.4 | 124 |
| Blank #2 | — | 43.1 | 133 |

As can be seen, the products produced by the process of U.S. Pat. No. 2,862,901 provide little, if any, increase in bursting strength and a moderate increase in internal bonding.

EXAMPLE 2

To a suitable reaction vessel are charged 258.25 parts of deionized water. A second vessel is then charged with 4.25 parts of concentrated hydrochloric acid, a third vessel with 37.5 parts of methylated trimethylolmelamine at 80% solids and to a fourth vessel 150.0 parts of a 10% solution of polyacrylamide of a molecular weight of about 200,000. All the vessels are heated to about 95° C. in a steam bath. The contents of the first vessel are slowly agitated while adding the contents of vessels two and three thereto. Agitation is increased and the contents of the first vessel are stirred for 30 seconds. While an acid colloid of the methylated trimethylolmelamine is forming, 150.0 parts thereof are removed and the polyacrylamide of vessel four is immediately added to the remaining partially formed acid colloid. Stirring thereof for 30 seconds is accomplished and 300 parts of deionized water are added to dilute the composition and stop the reaction and result in Composition A. To the 150.0 parts of removed acid colloid are added immediately 150.0 parts of deionized water to form Product B. The resultant Composition B has a faint haze. The molecular weight of the acid colloid of Composition B is higher than that of the acid colloid of Composition A. Composition B is not as effective in producing wet strength when applied to the paper-making fibers as in Example 1 as commercially available acid colloids.

When Product A is applied to the paper-making fibers as in Example 1, the Bursting Strength recorded is 49.2 lbs/in$^2$ at 6 pounds per ton and 50.4 lbs/in$^2$ at 9 pounds per ton. The Internal Bond is $174 \times 10^{-3}$ ft. -lb at 6 pounds per ton and $221 \times 10^{-3}$ ft. -lb at 9 pounds per ton.

EXAMPLE 3

To a suitable reaction vessel are added 258.0 parts of water and 4.25 parts of concentrated hydrochloric acid. The solution is heated to 90° C. and 37.5 parts of PAREZ ® 707 (80.0% solids), methylated trimethylol melamine (M/F) are added slowly with stirring. The agitation is increased for 30 seconds. Acid colloid formation begins as evidenced by the formation of a slight blue haze. 300 Parts of a 10% aqueous solution of nonionic polyacrylamide (PAM) having a molecular weight of about 290,000 are added before acid colloid formation is complete. High speed stirring is continued for an additional 30 seconds resulting in a 10% solution of melamine/formaldehyde acid colloid and polyacrylamide at a ratio of 1:1. The reaction is quenched by pouring it over 600 parts of ice and the resultant composition is diluted to 1% solids with water. The product is designated "Product A".

Following the teachings of U.S. Pat. No. 4,461,858, a cationic interaction product is made from polyvinyl alcohol (PVA), Elvanol 71-30 made by DuPont de Nemours and Company and a melamine/formaldehyde acid colloid made from PAREZ ® 707. This product is designated as "Product B".

The above products are both tested for their ability to impart dry strength to paper by adding them to a 0.6% consistency slurry of refined paper pulp. The first pulp designated "Pulp #1", is a 50/50 mixture of bleached hardwood kraft/bleached softwood draft containing no filler and adjusted to pH 4.5. The second pulp, "Pulp #2," is the same fiber mix but additionally contain 10% clay and is adjusted pH 6.5. Both furnishes are adjusted to 50 ppm $Ca^{++}$ by the addition of $CaCl_2$ and to 200 ppm $SO_4^=$ by the addition of $Na_2SO_4$. Appropriate amounts of resins are added to the pulps as indicated below and 70 pound basis weight handsheets are formed on a Noble A Wood handsheet machine. Dilution water for the deckle of the machine is deionized water treated with 50 ppm $Ca^{++}$, 200 ppm $SO_4^=$ and adjusted to pH 4.5 or 6.5 as the case may be. The sheets are pressed and dried on the machine and then given a slight pose cure of 3 minutes in an oven at 105° C. The results are set forth in Table 2, below. Additional data employing normal M/F resin alone (M/F) is also presented along with data obtained using a polyvinyl alcohol produced according to the process of the present invention. All such products are marked*.

TABLE 2

| Example | Additive | Amount (lb/ton) | Pulp | Burst (lb/in$^2$) | Tensile Dry (lb/in) | Tensile Wet (lb/in) | Internal Bond (ft/lb × 10$^{-3}$) | Clay (%) |
|---|---|---|---|---|---|---|---|---|
| — | Blank | — | #1 | 43.7 | 25.7 | 1.38 | — | — |
| 3A | M/F | 10 | #1 | 57.1 | 30.5 | 5.54 | — | — |
|  | M/F | 20 | #1 | 63.3 | 28.7 | 6.76 | — | — |
|  | M/F | 30 | #1 | 65.9 | 32.2 | 7.47 | — | — |
| 3B | M/F* | 10 | #1 | 53.4 | 30.9 | 4.83 | — | — |
|  | M/F* | 20 | #1 | 59.1 | 24.9 | 6.26 | — | — |
|  | M/F* | 30 | #1 | 61.9 | 27.2 | 7.01 | — | — |
| 3C | Product B | 10 | #1 | 54.0 | 25.5 | 3.49 | — | — |
|  | Product B | 20 | #1 | 57.4 | 29.6 | 4.86 | — | — |
|  | Product B | 30 | #1 | 60.2 | 26.4 | 5.73 | — | — |
| 3D | PVA/MF* | 10 | #1 | 56.1 | 22.2 | 3.54 | — | — |
|  | PVA/MF* | 20 | #1 | 57.6 | 32.2 | 5.49 | — | — |
|  | PVA/MF* | 30 | #1 | 65.3 | 32.8 | 5.82 | — | — |
| 3E | Product A | 10 | #1 | 62.2 | 30.9 | 4.93 | — | — |
|  | Product A | 20 | #1 | 69.1 | 34.3 | 5.95 | — | — |
|  | Product A | 30 | #1 | 70.4 | 35.0 | 6.65 | — | — |
| — | Blank | — | #2 | 42.0 | 24.1 | 1.18 | 83 | 1.17 |
| 3F | Product B | 10 | #2 | 46.5 | 24.8 | 2.07 | 99 | 2.87 |
|  | Product B | 20 | #2 | 52.9 | 30.0 | 3.17 | 138 | 2.84 |
|  | Product B | 30 | #2 | 56.9 | 33.5 | 4.74 | 169 | 2.41 |
| 3G | Product A | 10 | #2 | 53.4 | 30.0 | 3.26 | 92 | 6.33 |
|  | Product A | 20 | #2 | 58.9 | 32.6 | 3.78 | 147 | 5.41 |
|  | Product A | 30 | #2 | 63.3 | 35.5 | 4.06 | 180 | 4.69 |
| 3H | PAM/MF*[1] | 10 | #2 | 43.3 | 26.8 | 1.99 | 73 | 4.41 |
|  | PAM/MF*[1] | 20 | #2 | 48.2 | 27.9 | 2.39 | 71 | 4.88 |
|  | PAM/MF*[1] | 30 | #2 | 49.2 | 29.1 | 2.77 | 93 | 4.79 |
| 3I | PAM/MF*[2] | 10 | #2 | 42.9 | 24.5 | 1.90 | 61 | 5.77 |
|  | PAM/MF*[2] | 20 | #2 | 48.1 | 27.5 | 2.89 | 91 | 6.21 |

TABLE 2-continued

| Example | Additive | Amount (lb/ton) | Pulp | Burst (lb/in²) | Tensile Dry (lb/in) | Tensile Wet (lb/in) | Internal Bond (ft/lb × 10⁻³) | Clay (%) |
|---|---|---|---|---|---|---|---|---|
| | PAM/MF*² | 30 | #2 | 69.2 | 28.4 | 3.24 | 113 | 6.27 |

¹ratio 2:1, respectively
²ratio 1:2, respectively

The increase in clay retained in the sheet by Product A as compared with Product B should be noted. Improved retention is a valuable side effect of the compositions of this invention. Furthermore, the increase in clay content is achieved without the normal weakening of the sheet usually attendant increased filler content.

EXAMPLE 4

The procedure of Example 3 for the production of the Product A is repeated twice. Handsheets are prepared from these products ("Product C" and Product D") and compared to sheets prepared from other dry strength additives. The results are set forth in Table 3.

The handsheets are made using mill white water in the sump and recirculation. The pH is 6.6. The mill stock has a freeness of 78 ml. CSF and a fines content of 0.17%. The basis weight of the handsheets formed is 35 lbs. The first three discard sheets in each set are heavy due to retention of fines from the white water, and are slow to drain. The lowest treatment level is made first and the water remaining from this set is used for the next higher level. Only one discard sheet is made for the second and subsequent sets with that additive. Sheets are pressed between two blotters with 2½ pound weights and dried 35 seconds at 240° F. The sheets are cured 3 minutes at 105° C. before conditioning.

The starch/MF product is made by cooking a low molecular weight slightly ethylated, modified, commercially available starch at 10% solids and reacting the hot solution with an equal volume of hot 10% M/F resin acid colloid. After 5 minutes, the resultant product is diluted to 1% with cold water.

The PVA/MF product employed in this and following examples is a commercially available material from DuPont de Nemours Co. at 1% solids.

Mullen burst tests are made on doubled sheets because of the weakness of the stock, which is 100% recycled news. Tensile and internal bond tests are made by standard methods.

TABLE 3

| Example | Additive | Amount (lb/ton) | Burst (lb/in²) | Internal Bond (ft-lbs × 10⁻³) | Dry Tensile (lbs/in) |
|---|---|---|---|---|---|
| — | Blank | — | 11.75 | 24 | 8.03 |
| 4A | PVA/MF | 3 | 13.40 | 22 | 9.43 |
| | PVA/MF | 6 | 11.40 | 22 | 8.08 |
| | PVA/MF | 9 | 12.50 | 28 | 8.38 |
| | PVA/MF | 12 | 12.40 | 33 | 8.63 |
| 4B | Product C | 3 | 13.20 | 23 | 9.29 |
| | Product C | 6 | 13.30 | 30 | 8.22 |
| | Product C | 9 | 14.50 | 48 | 9.63 |
| | Product C | 12 | 14.70 | 59 | 9.70 |
| 4C | Product D | 3 | 11.90 | 21 | 8.35 |
| | Product D | 6 | 12.60 | 27 | 8.85 |
| | Product D | 9 | 13.40 | 37 | 9.88 |
| | Product D | 12 | 15.20 | 52 | 11.37 |
| | Starch/MF | 3 | 12.70 | 31 | 8.32 |
| | Starch/MF | 3 | 11.80 | 18 | 8.91 |
| | Starch/MF | 9 | 11.60 | 22 | 8.14 |
| | Starch/MF | 12 | 11.90 | 24 | 8.85 |

EXAMPLE 5

The procedure of Example 3 for the production of Product A is repeated thrice. Handsheets are prepared from these products ("Products E, F and G") and compared to sheets prepared from other dry strength additives. The results are set forth in Table 4.

Unbleached kraft is beaten for 45 minutes to 500 ml. CSF and equilibrated overnight with 3% black liquor solids. Pulp and dilution water are treated with 200 ppm=SO₄ Standard single pass handsheets are made at 70 pounds basis weight and tested by standard methods. Alum is used at 15 lb/ton. The pH is 5.0. This furnish is designated "Pulp C."

Rotogravure furnish containing 47% bleached kraft, 35% groundwood and 18% TMP is designated "Pulp D". With this furnish 15 lb/ton of alum is used and 15 lb/ton of sodium aluminate. Pulp and dilution water is treated with 200 ppm SO₄= and 50 ppm Ca++. The pH is 4.5.

TABLE 4

| Example | Additive | Amount (lb/ton) | Pulp | Burst (lb/in²) | Internal Bond (ft-lb × 10⁻³) | Dry Tensile (lb/in) |
|---|---|---|---|---|---|---|
| — | Blank | — | C | 57.6 | 65 | 31.74 |
| 5A | Product E | 3 | C | 62.3 | 79 | 35.99 |
| | Product E | 6 | C | 61.3 | 78 | 38.31 |
| | Product E | 9 | C | 63.1 | 78 | 37.22 |
| | Product E | 12 | C | 60.9 | 85 | 32.73 |
| | Product E | 15 | C | 64.7 | 89 | 32.65 |
| 5B | Product F | 3 | C | 61.6 | 74 | 36.37 |
| | Product F | 6 | C | 59.1 | 77 | 35.90 |
| | Product F | 9 | C | 61.5 | 91 | 34.94 |
| | Product F | 12 | C | 62.9 | 70 | 35.81 |
| | Product F | 15 | C | 65.9 | 63 | 34.52 |
| 5C | Product G | 3 | C | 58.2 | 69 | 34.70 |
| | Product G | 6 | C | 58.9 | 68 | 34.51 |
| | Product G | 9 | C | 62.4 | 63 | 36.07 |
| | Product G | 12 | C | 59.8 | 63 | 34.03 |
| | Product G | 15 | C | 60.9 | 58 | 34.59 |
| 5D | PVA/MF | 3 | C | 57.2 | 62 | 33.93 |
| | PVA/MF | 6 | C | 58.1 | 62 | 34.95 |
| | PVA/MF | 9 | C | 57.8 | 57 | 35.20 |
| | PVA/MF | 12 | C | 58.6 | 51 | 34.42 |
| | PVA/MF | 15 | C | 57.9 | 60 | 35.06 |
| | Blank | — | — | 71.65 | 162 | 40.6 |
| 5E | PVA/MF | 3 | D | 75.0 | 160 | 36.9 |
| | PVA/MF | 6 | D | 75.8 | 158 | 46.6 |
| | PVA/MF | 9 | D | 74.8 | 122 | 42.4 |
| | PVA/MF | 12 | D | 75.4 | 130 | 45.9 |
| | PVA/MF | 15 | D | 76.8 | 161 | 43.4 |
| 5F | Product E | 3 | D | 74.0 | 127 | 39.8 |
| | Product E | 6 | D | 77.4 | 155 | 41.5 |
| | Product E | 9 | D | 77.9 | 154 | 45.1 |
| | Product E | 12 | D | 81.6 | 172 | 46.0 |
| | Product E | 15 | D | 80.0 | 196 | 40.2 |
| 5G | Product F | 3 | D | 75.3 | 156 | 46.4 |
| | Product F | 6 | D | 77.6 | 195 | 43.2 |
| | Product F | 9 | D | 81.1 | 176 | 45.0 |
| | Product F | 12 | D | 79.6 | 217 | 45.2 |
| | Product F | 15 | D | 81.0 | 211 | 41.7 |

EXAMPLE 6

Paper stock from an operating paper mill making fine paper is diluted to 0.6% and treated with 60 pounds per ton of alum and adjusted to pH 4.5 which are the conditions of mill use. The resultant stock is treated with "Product H", a polyacrylamide—M/F resin/acid colloid copolymer prepared as in Example 3 for Product A sults are set forth in Table 6. The burst tests are conducted in both the mill and the laboratory.

TABLE 6

| Example | Additive | Amount (lb/ton) | Caliper Mils | Burst (lb/in²) Mill | Burst (lb/in²) Lab | Internal Bond (ft-lbs × 10³) | Bulk cc/g. |
|---|---|---|---|---|---|---|---|
| — | Blank | 5 | 5.2 | 38.2 | 38.6 | 94 | 1.88 |
| 7A | Product I | 5 | 4.7 | 41.5 | 43.2 | 137 | 1.77 |
|  | Product I | 10 | 5.0 | 41.1 | 44.1 | 156 | 1.75 |
|  | Product I | 15 | 4.8 | 45.5 | 46.1 | 167 | 1.68 |
| 7B | Commercial A | 5 | 5.4 | 37.0 | 36.6 | 96 | 1.87 |
|  | Commercial A | 10 | 5.6 | 37.8 | 40.6 | 88 | 1.87 |
|  | Commercial A | 15 | 5.7 | 40.0 | 37.2 | 95 | 1.86 |
| 7C | Commercial B | 5 | 5.6 | 41.8 | 39.9 | 70 | 1.87 |
|  | Commercial B | 10 | 5.6 | 43.3 | 41.1 | 92 | 1.87 |
|  | Commercial B | 15 | 5.5 | 42.2 | 41.7 | 104 | 1.86 |
| 7D | Commercial C | 5 | 5.5 | 41.4 | 41.1 | 96 | 1.85 |
|  | Commercial C | 10 | 5.6 | 39.5 | 40.5 | 105 | 1.82 |
|  | Commercial C | 15 | 6.0 | 40.1 | 43.2 | 145 | 1.93 |
| 7E | Commercial D | 5 | 5.6 | 37.9 | 38.2 | 101 | 1.88 |
|  | Commercial D | 10 | 6.4 | 36.3 | 37.6 | 89 | 2.12 |
|  | Commercial D | 15 | 6.1 | 37.3 | 37.3 | 84 | 2.03 |
| 7F | Commercial E | 10 | 6.5 | 39.2 | 41.6 | 119 | 2.07 |
|  | Commercial E | 20 | 6.1 | 42.3 | 40.4 | 131 | 1.94 |
|  | Commercial E | 30 | 5.9 | 44.8 | 45.4 | 181 | 1.88 | and formed into 70 pound basis weight handsheets. Comparisons to commerically available products are also made. The results are set forth in Table 5. The Fold tests are conducted on an M.I.T. fold tester; double folds; 2 lb. load. "Product 85" is a commerically available acrylamide/acrylic acid (90/10) copolymer.

TABLE 5

| Example | Additive | Amount (lb/ton) | Burst (lb/in²) | Internal Bond (ft-lb × 10⁻³) | Fold |
|---|---|---|---|---|---|
| — | Blank | — | 41.8 | 111 | 84.3 |
| 6A | Product H | 5 | 56.3 | 226 | 260.1 |
|  | Product H | 10 | 63.8 | 360 | 555.6 |
|  | Product H | 15 | 67.9 | 387 | 894.9 |
| 6B | Product 85 | 5 | 50.1 | 188 | 165.9 |
|  | Product 85 | 10 | 54.4 | 205 | 241.1 |
|  | Product 85 | 15 | 57.1 | 236 | 313.4 |
| 6C | M/F Acid Colloid | 5 | 48.1 | 158 | 140.5 |
|  | M/F Acid Colloid | 10 | 52.7 | 187 | 205.5 |
|  | M/F Acid Colloid | 15 | 57.4 | 195 | 285.5 |

EXAMPLE 7

A 40% softwood, 30% hardwood, 30% RMP pulp is diluted to 0.6% consistency with mill white water and heated with alum and additive and adjusted to pH 4.7. Six British handsheets are made and pressed under TAPPI conditions, oven dried to 5% moisture, equilibrated under TAPPI conditions, weighed and tested.

"Product I" is a copolymer of the present invention prepared as in Example 3 for Product A. "Commercial A" is a commercially available Mannich quaternization product of polyacrylamide. "Commercial B" is a commercially available glyoxalated acrylamide/ diallyldimethylammononium chloride copolymer blended with a quaternized epichlorohydrin/amine reaction product. "Commercial C" is a commercially available glyoxalated acrylamide/diallyldimethylammonium chloride copolymer. "Commercial D" is the same as Product 85, Example 6. "Commercial E" is a commercially available poly(ampholytic starch). The starch is slurred at 3% and cooked at the boil for 30 minutes with cationizing reagent at ambient pH. The laboratory re- A sample of Product A produced in Example 3 is added to long-fibered cotton pulp, at a pH of 4.2, along with 40 pounds per ton of alum. Handsheets are formed from the resultant pulp and tested. The results are set forth in Table 7. Fold tests are conducted as in Example 6.

TABLE 7

| Example | Additive Amount (lb/ton) | Fold | Tensile (lb/in) Dry | Tensile (lb/in) Wet | Tear |
|---|---|---|---|---|---|
| — | Blank | 17.8 | 2.70 | 0.41 | 105 |
| 8A | 20 | 387 | 4.43 | 1.21 | 120 |
| 8B | 45 | 1452 | 6.77 | 1.95 | 114 |
| 8C | 90 | 2340 | 7.26 | 2.0 | 110 |

Formation is noted as adversly affected, probably due to the use of a long-fibered pulp stock.

In a subsequent trial on a commercial paper machine, paper of excellent quality with exceptionally high folding endurance and erasability is made.

EXAMPLE 9

To a suitable reaction vessel are charged 250 parts of a 10% aqueous polyacrylamide solution (MW=150,000) and 204 parts of deionized water. The solution is heated to 60° C. and 8.5 parts of hydrochloric acid are added over a period of one minute. Thirty-seven parts of melamine/formaldehyde are added slowly and the viscosity is monitored over 43 minutes until a Shell cup viscosity of 28.45 seconds is attained. The reaction is then terminated by adding 250 parts of cold deionized water. The resultant solution is then diluted to 2% solids and tested as a dry strength agent identified as "Comparative A", by adding to a paper pulp to drawing down handsheets therefrom. The results are set forth in Table 8 and compared to a commercially available cationic polyacrylamide/glyoxal resin designated "Resin A" and to a copolymer of the process of the present invention prepared as for Product A in Example 3 and identified as "Product J".

TABLE 8

| Example | Additive | Amount (lb/ton) | Burst (lb/in$^2$) | Internal Bond (ft-lb × 10$^{-3}$) | Dry Tensile (lb/in) |
|---|---|---|---|---|---|
| — | Blank | — | 40.4 | 65 | 23.51 |
| 9A | Resin A | 6 | 57.5 | 130 | 31.50 |
| | Resin A | 9 | 64.2 | 152 | 34.31 |
| | Resin A | 12 | 68.0 | 170 | 33.81 |
| 9B | Product J | 6 | 59.7 | 129 | 29.26 |
| | Product J | 9 | 58.6 | 132 | 29.47 |
| | Product J | 12 | 62.2 | 169 | 30.04 |
| 9C | Comparative A | 6 | 55.4 | 101 | 29.37 |
| | Comparative A | 9 | 56.0 | 110 | 29.31 |
| | Comparative A | 12 | 60.7 | 115 | 29.66 |

EXAMPLES 10 and 11

The procedure of Example 3 is again followed except that the ratio of the amino-aldehyde resin to the acrylamide polymer ranges 10) from about 4:1, respectively, and 11) from about 1:4, respectively. In each instance, similar results are obtained.

EXAMPLE 12

The procedure of Example 2 is followed except that the polyacrylamide is replaced by a 80/20 copolymer of acrylamide and acrylonitile, molecular weight 342,000. Similar results are observed.

EXAMPLE 13

Example 12 is repeated in all essential details except that a copolymer of methacrylamide and styrene (90/10) is employed. The molecular weight is 400,000. Again, excellent results are achieved.

EXAMPLE 14

When the procedure of Example 3 is followed except that the polyacrylamide has a molecular weight of only 32,000, poor results occur.

EXAMPLE 15

The procedure of Example 2 is followed except that nitric acid is employed in lieu of the hydrochloric acid thereof. The mol ratio of nitric acid to melamine is 0.8:1.0, respectively. Excellent results are achieved.

EXAMPLE 16

When phosphoric acid is used in place of the hydrochloric acid of Example 2, substantially identical results are recorded. The mol ratio of phosphoric acid to melamine is 13:1, respectively.

EXAMPLE 17

Replacement of the melamine/formaldehyde resin of Example 2 with a non-alkylated melamine/formaldehyde resin results in substantially the same as shown therein.

EXAMPLE 18

A furnish comprised of a 50/50 mixture of hardwood-softwood bleached kraft is adjusted to a pH of 6.5. The Ca$^{++}$ content is adjusted to 50 ppm and the SO$_4$$^=$ content to 200 ppm. To the resultant furnish are added various amounts of an acrylamide polymer—M/F resin acid colloid copolymer prepared as in Example 3 (Product A) wherein the acrylamide polymer is a copolymer of acrylamide and dimethylaminoethyl acrylate quaternized with methyl chloride (90/10). The results are set forth in Table 9.

TABLE 9

| Amount of Copolymer (lb/ton) | Mobility | Burst (lb/in$^2$) | Internal Bond (ft/lbs × 10$^{-3}$) | Tensile Dry (lb/in) | Tensile Wet (lb/in) |
|---|---|---|---|---|---|
| Control | −0.89 | 50.3 | 74 | 28.11 | 0.51 |
| 3.0 | −0.59 | 57.3 | 104 | 31.29 | 1.21 |
| 6.0 | 0.00 | 55.0 | 107 | 30.65 | 1.42 |
| 9.0 | +0.24 | 61.3 | 123 | 30.88 | 1.74 |
| 12.0 | +0.51 | 61.5 | 129 | 30.63 | 2.04 |

EXAMPLE 19

Following the procedure of Example 18 except that a 3.0 lb/ton addition is not used, the following results are achieved.

For 6, 9 and 12 pounds of additive copolymer per ton the Burst is 60.2; 62.3; 63.8 lbs/in$^2$, respectively, the Internal Bond is 115; 112; 115 ft./lbs. × 10$^{-3}$, respectively, and the Dry Tensile is 31.27; 31.15; 33.59 lb/in, respectively. The respective values for the Control are 48.7; 67.0 and 25.95.

EXAMPLE 20

Standard newsprint furnish is charged to a standard Fourdrinier paper-making machine at a rate of 21 tons per hour. The machine is running at a paper-making speed of 2500 ft./min. The pH of the furnish is 4.5 and contains 17.0 pounds per ton of alum. Product A of Example 3 is added as a 2% aqueous solution to the thick stock entering the blend chest. The machine is monitored over a two day period. The results are set forth in Table 10, below. The PVA/MF is the same as that of Example 4.

TABLE 10

| Additive | Amount lb/ton | Time | Burst (lb/in$^2$) | Internal Bond (ft/lbs × 10$^{-3}$) |
|---|---|---|---|---|
| Control | — | — | 10.1 | 80 |
| Control | — | — | 9.8 | 90 |
| PVA/MF | 10 | 10:55 AM | 10.4 | 114 |
| PVA/MF | 10 | 11:40 AM | 10.6 | 118 |
| PVA/MF | 10 | 12:30 PM | 10.5 | 112 |
| PVA/MF | 10 | 1:15 PM | 10.7 | 107 |
| Product A started at 1:45 → → → | | | | |
| Product A | 4 | 2:00 PM | 10.4 | 106 |
| Product A | 4 | 2:55 PM | 11.4 | 113 |
| Product A | 4 | 3:55 PM | 10.4 | 107 |
| Product A - Amount changed to 6 at 4:05 PM | | | | |
| Product A | 6 | 4:25 PM | 10.9 | 114 |
| Product A | 6 | 5:15 PM | 10.2 | 113 |
| Product A | 6 | 6:05 PM | 10.9 | 137 |
| Product A - Amount changed to 8 at 6:20 PM | | | | |
| Product A | 8 | 7:25 PM | 10.8 | 130 |
| Product A | 8 | 9:10 PM | 11.3 | 123 |
| Product A | 8 | 10:10 PM | 10.9 | 128 |
| Product A | 8 | 11:10 PM | 11.9 | 129 |
| Product A | 8 | 12:10 AM | 11.1 | 128 |
| Product A | 8 | 1:05 AM | 11.1 | 119 |
| Product A | 8 | 1:50 AM | 10.8 | 138 |
| Product A | 8 | 2:40 AM | 10.8 | 135 |
| Product A | 8 | 3:30 AM | 11.1 | 136 |
| Product A | 8 | 4:25 AM | 10.2 | 129 |
| Product A | 8 | 5:40 AM | 11.0 | 132 |
| Product A | 8 | 6:30 AM | 10.9 | 130 |
| Product A | 8 | 7:10 AM | 10.2 | 122 |
| Product A - amount changed to 10 at 7:25 AM | | | | |
| Product A | 10 | 8:10 AM | 10.7 | 125 |

The advantages of the copolymer of the present invention are many. For example, it is possible to match the product needs of any specific paper mill by varying the amount of acrylamide polymer and/or amino-aldehyde resin. The specific products can be prepared for specific mills, thereby achieving maximum results with regard to both economics and efficiency. Furthermore, the novel compositions hereof are effective over a wide pH range, with all types of pulp and in the presence of fillers and pulping chemicals. They are the only compositions known to be more effective than cationic starch particularly in furnishes containing high amounts of ground wood. They have also been found to be effective in increasing printability and decreasing linting during the printing of paper made therewith. They are especially effective in groundwood, newsprint, and even highly purified chemical pulp. They combine the good properties of the acid colloids, i.e., high cationicity, density and retention, with the dry strength efficiency of acrylamide polymers. As can be seen from the previous examples, the novel compositions and process hereof provides paper with improved tensile strength, internal bonding, bursting, ply-bonding strength, folding endurance, stiffness, sizing capability and fiber and fines retention.

We claim:

1. A method of producing dry strength in paper which comprises applying to the fibers thereof from about 0.15% to about 5.0%, by weight, based on the weight of the fibers, of an aqueous solution of a copolymer produced by a method which comprises forming an incomplete acid colloid by reacting 1 mole of an acid-soluble, partially condensed, thermosetting, amino-aldehyde resin, in aqueous solution, with from about 0.35 to about 1.5 mole of an acid for from about 15 seconds to about 45 minutes and at a temperature ranging from about 50° C. to about 100° C., reacting (1) a water-soluble or water-dispersible, non-anionic acrylamide polymer with (2) said incompletely formed acid colloid for from about 15 to about 45 minutes at a temperature ranging from about 40° C. to about 100° C., the ratio of (1):(2) ranging from about 4:1 to 1:4, by weight, respectively, and at a total solids content of not more than about 20%, by weight, based on the total weight of the reaction media, to thereby form an aqueous solution of a copolymer of said (1) and (2) formation of said acid colloid continuing in the presence of said added acrylamide polymer during said polymer addition.

2. A method according to claim 1 wherein the amino-aldehyde resin is melamine-formaldehyde.

3. A method according to claim 1 wherein the acrylamide polymer is polyacrylamide.

4. A method according to claim 1 wherein the amino-aldehyde resin is melamine-formaldehyde and the acrylamide polymer is polyacrylamide.

5. A method according to claim 1 wherein the molecular weight of the acrylamide polymer ranges from about 40,000 to about 500,000.

6. Paper having a uniform content of from about 0.15% to about 5.0%, by weight, of its dry weight, of a copolymer produced by a method which comprises incomplete acid colloid by reacting 1 mole of an acid-soluble, partially condensed, thermosetting, amino-aldehyde resin, in aqueous solution, with from about 0.35 to about 1.5 mol of an acid for from about 15 seconds to about 45 minutes and at a temperature ranging from about 50° C. to about 100° C., reacting (1) a water-soluble or water-dispersible, non-anionic acrylamide polymer with (2) said incompletely formed acid colloid from from about 15 to about 45 minutes at a temperature ranging from about 40° C. to about 100° C., the ratio of (1):(2) ranging from about 4:1 to 1:4, by weight, respectively, and at a total solids content of not more than about 20%, by weight, based on the total weight of the reaction media, to thereby form an aqueous solution of a copolymer of said (1) and (2), formation of said acid colloid continuing in the presence of said added acrylamide polymer during said polymer addition.

7. Paper according to claim 6 wherein the amino-aldehyde resin is melamine-formaldehyde.

8. Paper according to claim 6 wherein the acrylamide polymer is polyacrylamide.

9. Paper according to claim 6 wherein the amino-aldehyde resin is melamine-formaldehyde and the acrylamide polymer is polyacrylamide.

10. Paper according to claim 6 wherein the molecular weight of the acrylamide polymer ranges from about 40,000 to about 500,000.

* * * * *